A. FREED & J. SNOOK.
BINDING ATTACHMENT FOR HARVESTERS.
No. 110,841.  Patented Jan. 10, 1871.
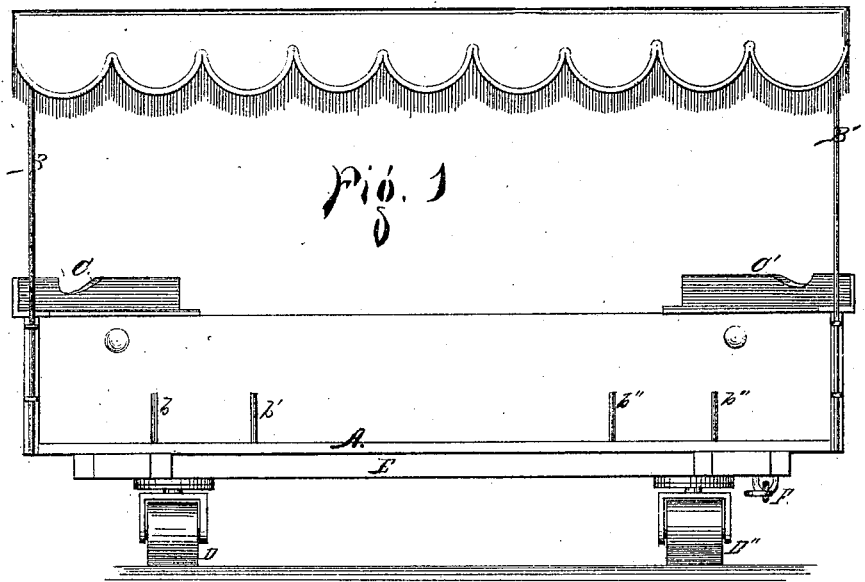
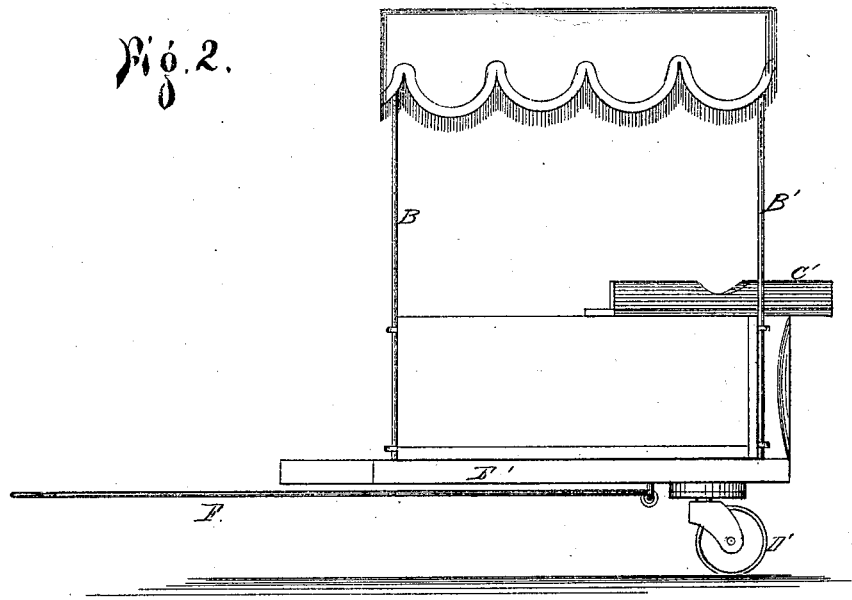
Witnesses.
Inventor.

UNITED STATES PATENT OFFICE.

ABRAHAM FREED AND JONATHAN SNOOK, OF LA PORTE, INDIANA.

IMPROVEMENT IN BINDING ATTACHMENTS FOR HARVESTERS.

Specification forming part of Letters Patent No. 110,841, dated January 10, 1871; antedated January 7, 1871.

*To all whom it may concern:*

Be it known that we, ABRAHAM FREED and JONATHAN SNOOK, of La Porte, in the county of La Porte, in the State of Indiana, have invented certain Improvements in Attachment Binders to Grain-Reapers, of which the following is a specification.

Our invention consists in forming a body of any suitable material to be worked in connection with the reaper to which it is attached. This body is placed on wheels, and the binders occupy it. The grain is delivered from the reaper into the vehicle against the pins, when the binders pick it up and place it upon the tables of the rear corners of the vehicle, bind it, and throw it out. By this arrangement the binders ride instead of walk, performing their labor with much more ease, with greater rapidity, and therefore more economically. Attached to this vehicle are two upright rods, to which the awning or covering is attached. These are adjustable, so that the awning or covering can be raised or lowered, and in cloudy weather, when not needed as a protection from the sun, may be taken off.

In the accompanying drawings, Figure 1 is a front elevation of a machine—our invention. Fig. 2 is an end elevation of the same.

A is the body of the machine, vehicle, or platform for the binders.

B B' represent the frame or rods and the awning, as shown.

$b$ $b'$ $b''$ $b'''$ represent the four pins against which the grain is thrown from only the reaper.

C C' represent the takes in the rear corners of the vehicle, upon which the grain is placed and bound, which are secured to an upright, $c$, also resting on the body of the vehicle.

D D' represent the wheels upon which the vehicle is placed.

E E' represent the frame supporting the platform or body of the vehicle, also connecting the same to the reaper.

F is a connecting-rod.

We claim—

A binding attachment for grain-reapers when constructed in all its parts and arranged as set forth, as herein shown and described, having tables C C', frame A, pins $l$ $l'$ and $l''$ $l'''$, rollers D D, connecting-rod F, and rods B B' for supporting the awning.

ABRAHAM $\overset{\text{his}}{\times}$ FREED.
$\phantom{ABRAHAM}$ mark.
JONATHAN SNOOK.

Witnesses:
  ROBT. A. HEWS,
  MORTIMER NYE.